(12) United States Patent
Liu

(10) Patent No.: US 9,372,517 B2
(45) Date of Patent: Jun. 21, 2016

(54) MICRO-CONTROLLER RESET SYSTEM AND RESET METHOD THEREOF

(71) Applicants: Inventec (Pudong) Technology Corporation, Shanghai (CN); INVENTEC CORPORATION, Taipei (TW)

(72) Inventor: Jian-Fei Liu, Shanghai (CN)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 149 days.

(21) Appl. No.: 14/506,687

(22) Filed: Oct. 5, 2014

(65) Prior Publication Data

US 2016/0048182 A1   Feb. 18, 2016

(30) Foreign Application Priority Data

Aug. 15, 2014  (CN) .......................... 2014 1 0403265

(51) Int. Cl.
*G06F 1/00* (2006.01)
*G06F 1/24* (2006.01)
*G06F 1/26* (2006.01)

(52) U.S. Cl.
CPC ... *G06F 1/24* (2013.01); *G06F 1/26* (2013.01)

(58) Field of Classification Search
CPC ...................................... G06F 1/26; G06F 1/24
USPC ............ 713/340; 327/142, 143; 320/106, 140
See application file for complete search history.

(56) References Cited

U.S. PATENT DOCUMENTS

| | | | | |
|---|---|---|---|---|
| 5,313,112 A * | 5/1994 | Macks | ...................... | G06F 1/24 327/142 |
| 7,656,623 B2 * | 2/2010 | Fadell | ..................... | G06F 1/266 320/106 |
| 2009/0121753 A1 * | 5/2009 | Huang | ..................... | G06F 1/26 327/143 |
| 2009/0144576 A1 * | 6/2009 | Camilleri | .................. | G06F 1/30 713/340 |
| 2011/0241625 A1 * | 10/2011 | LoCascio | ............. | H02J 7/0052 320/140 |

FOREIGN PATENT DOCUMENTS

| | | |
|---|---|---|
| TW | 264135 | 11/1995 |
| TW | I317571 B | 11/2009 |
| TW | I369048 | 7/2012 |

* cited by examiner

*Primary Examiner* — Aurel Prifti
(74) *Attorney, Agent, or Firm* — CKC & Partners Co., Ltd.

(57) ABSTRACT

A reset system comprises an enable circuit, a buck converter and a reset circuit. The enable circuit is connected to a system power source. When a voltage of the system power source is greater than a first voltage, the enable circuit outputs an enable signal with a steep leading edge. The buck converter converts the system power source to a micro-controller power source according to the enable signal. The reset circuit is connected to the system power source and the micro-controller power source. When a voltage of the system power source is less than a second voltage, the reset circuit outputs a reset signal to reset the micro-controller. The first voltage is smaller than the second voltage.

8 Claims, 4 Drawing Sheets

MICRO-CONTROLLER RESET SYSTEM AND RESET METHOD THEREOF

RELATED APPLICATIONS

This application claims priority to Chinese Application Serial Number 201410403264.1, filed Aug. 15, 2014, which is herein incorporated by reference.

BACKGROUND

1. Field of Invention

The invention relates to a reset system, and particularly relates to a micro-controller reset system and reset method thereof.

2. Description of Related Art

A reset system is commonly found in a current electrical apparatus to perform a reset process to ensure that the process is performed normally when power is applied to the electrical apparatus again. For example, when power starts to be applied to the electrical apparatus, the reset system output is used to hold a micro-controller in the electrical apparatus at a reset state for a period of time so as to perform a reset process. Conventionally, a timer is disposed in the reset system to accomplish this reset task. The timer continues to hold the micro-controller at the reset state for a preset period of time, and after the preset period of time enables the micro-controller to leave the reset state and to begin operation.

The conventional reset system is operated before the electrical apparatus is booted. However, some micro-controllers also need to perform a rest process before the electrical apparatus is shut down to ensure that the process is performed normally when power is applied to the electrical apparatus again. Therefore, there is a need for a reset system to automatically perform a rest process before the electrical apparatus is shut down.

Accordingly, the present invention provides a reset system and reset method to make a micro-controller of an electrical apparatus perform a reset process while the electrical apparatus is turned off.

The invention provides a micro-controller reset system. The reset system comprises an enable circuit, a buck converter and a reset circuit. The enable circuit electrically connects to a system power source. When a voltage of the system power source is raised to be greater than a first voltage, the enable circuit outputs an enable signal with a steep leading edge. The buck converter converts the system power source to output a micro-controller power source to the micro-controller according to the enable signal. The reset circuit electrically connects to the system power source and the micro-controller power source. When a voltage of the system power source is dropped to be smaller than a second voltage, the reset circuit outputs a reset signal to reset the micro-controller. The first voltage is smaller than the second voltage. When the reset system enters a power drop state, the voltage of the system power source begins to drop to cause the voltage of the micro-controller power source to drop. When the voltage of the system power source is dropped to be smaller than the second voltage but greater than the first voltage, the reset circuit outputs the reset signal and the enable circuit still outputs the enable signal. Because the enable signal controls the buck converter to output the micro-controller power source to the micro-controller, the micro-controller continues to work to receive the reset signal to perform a reset process. Therefore, the micro-controller may perform a reset process while the micro-controller is in a power drop state.

In an embodiment, the reset circuit further comprises a first transistor and a voltage comparator. The first transistor electrically connects to the micro-controller. The voltage comparator electrically connects to the first transistor. When the voltage of the system power source is dropped to be smaller than the second voltage, the voltage comparator outputs a positive voltage signal to turn on the first transistor. When the first transistor is turned on, the first transistor outputs a reset signal to reset the micro-controller.

In an embodiment, a positive input end of the voltage comparator electrically connects to a divided voltage of the micro-controller power source, and a negative input end of the voltage comparator electrically connects to a divided voltage of system power source. When a voltage at the positive input end is smaller than that at the negative input end, the voltage comparator outputs a negative voltage signal to turn off the first transistor.

In an embodiment, the reset circuit further comprises a resistor. One end of the resistor electrically connects to the positive input end of the voltage comparator, the other end of the resistor electrically connects to the output end of the voltage comparator. The resistor improves the positive feedback velocity of the voltage comparator.

In an embodiment, the enable circuit further comprises a second transistor and a third transistor. The second transistor electrically connects to the system power source. The third transistor electrically connects to the second transistor, the system power source and the buck converter. When the voltage of the system power source is raised to be greater than the first voltage, the second transistor is turned on and the third transistor is turned off to make the enable circuit output the enable signal.

In an embodiment, when the voltage of the system power source is smaller than a third voltage, both the second transistor and the third transistor are turned off. The enable signal is from the divided voltage of the system power source. When the voltage of the system power source is raised to be greater than the third voltage but smaller than the first voltage, the third transistor is turned on. The enable signal is 0 volt. When the voltage of the system power source is raised to be greater than the first voltage, the second transistor is turned on and the third transistor is turned off. An efficient enable signal is outputted.

In an embodiment, the enable circuit further comprises a delay circuit electrically connected to the second transistor and the system power source to delay the second transistor to be turned on.

The invention also provides a micro-controller reset method. First, when a voltage of a system power source is raised to be greater than a first voltage, an enable circuit is triggered to output an enable signal with a steep leading edge. Then, according to the enable signal, a buck converter is triggered to convert the system power source to output a micro-controller power source to a micro-controller. Finally, When a voltage of the system power source is dropped to be smaller than a second voltage but greater than the first voltage, a reset circuit is triggered to output a reset signal to reset the micro-controller, and the enable circuit still outputs the enable signal to control the buck converter to output the micro-controller power source to the micro-controller to make the micro-controller in a work state to finish the reset process.

In an embodiment, the reset circuit further comprises a first transistor and a voltage comparator. The first transistor electrically connects to the micro-controller. The voltage comparator electrically connects to the first transistor. When the voltage of the system power source is dropped to be smaller than the second voltage, the voltage comparator outputs a positive voltage signal to turn on the first transistor. When the first transistor is turned on, the first transistor outputs a reset signal to reset the micro-controller.

In an embodiment, the enable circuit further comprises a second transistor and a third transistor. The second transistor electrically connects to the system power source. The third transistor electrically connects to the second transistor, the system power source and the buck converter. When the voltage of the system power source is raised to be greater than the first voltage, the second transistor is turned on and the third transistor is turned off to make the enable circuit output the enable signal.

Accordingly, when the electrical apparatus is turned off and the voltage of the system power source is dropped to be smaller than a special voltage, the reset circuit outputs a reset signal, and the enable circuit keeps outputting the enable signal to make the micro-controller at a work state to finish the reset process. Therefore, the micro-controller may perform a reset process according to the reset signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
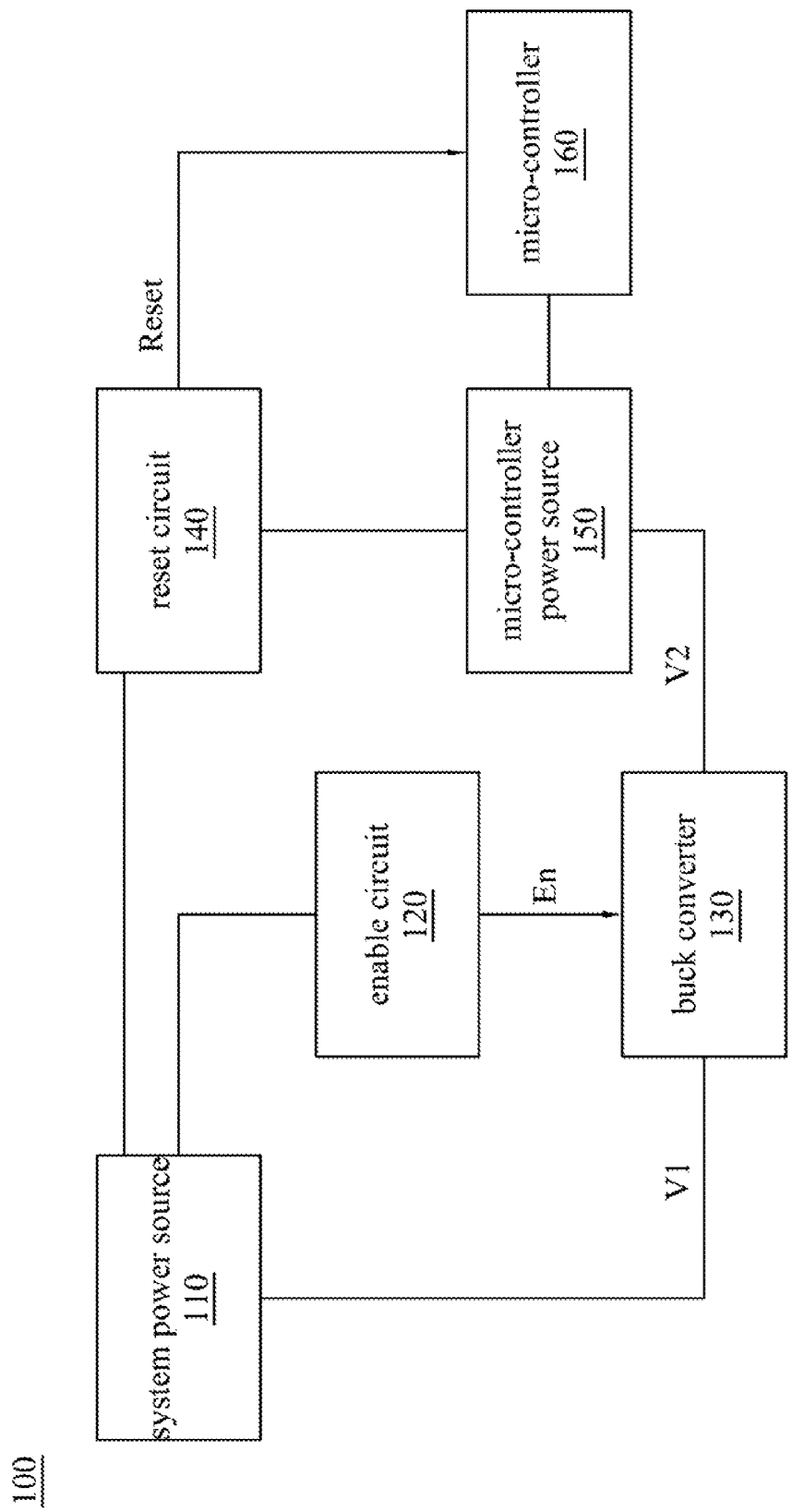
FIG. 1 illustrates a schematic diagram of a micro-controller reset system according to an embodiment of the invention.

Reference will now be made in detail to the present embodiments of the invention, examples of which are illustrated in the accompanying drawings. Wherever possible, the same reference numbers are used in the drawings and the description to refer to the same or like parts. It is noted that, in accordance with the standard practice in the industry, various features are not drawn to scale. In fact, the dimensions of the various features may be arbitrarily increased or reduced for clarity of discussion.

FIG. 1 illustrates a schematic diagram of a micro-controller reset system according to an embodiment of the invention. The micro-controller reset system 100 comprises an enable circuit 120, a buck converter 130 and a reset circuit 140. The enable circuit 120 is electrically connected to a system power source 110. When a voltage of the system power source 110 is raised to be greater than a first voltage, the enable circuit 120 outputs an enable signal (En) with a steep leading edge. The buck converter 130 is also electrically connected to the system power source 110. The buck converter 130 receives the enable signal (En) from the enable circuit 120 to convert the output voltage (V1) of the system power source to a voltage (V2) of the micro-controller power source 150, so as to supply power to the micro-controller 160. The reset circuit 140 is electrically connected to the system power source 110 and the micro-controller power source 150. When a voltage of the system power source 110 is dropped to be smaller than a second voltage, the reset circuit 140 outputs a reset signal (Reset) to reset the micro-controller 160. The first voltage is smaller than the second voltage.

In other words, according to the micro-controller reset system 100, when the reset system 100 is at a power drop state, the output voltage (V1) of the system power source 110 begins to drop. Therefore, the voltage (V2) of the micro-controller power source 150 also begins to drop. When the output voltage (V1) of the system power source 110 is dropped to be smaller than the second voltage but greater than the first voltage, the reset circuit 140 outputs the reset signal (Reset). At this time, because the output voltage (V1) of the system power source 110 is still greater than the first voltage, the enable circuit 120 continues to output the enable signal (En). Because the buck converter 130 is controlled by the enable signal (En), the buck converter continues to convert the output voltage (V1) of the system power source 110 to the voltage (V2) of the micro-controller power source 150 to supply power to the micro-controller 160. Therefore, the micro-controller 160 may receive the reset signal (Reset) from the reset circuit 140 to perform a reset process. Accordingly, the object that the micro-controller 160 may perform a reset process while the micro-controller 160 is at a power drop state can be achieved.

Figure 2:
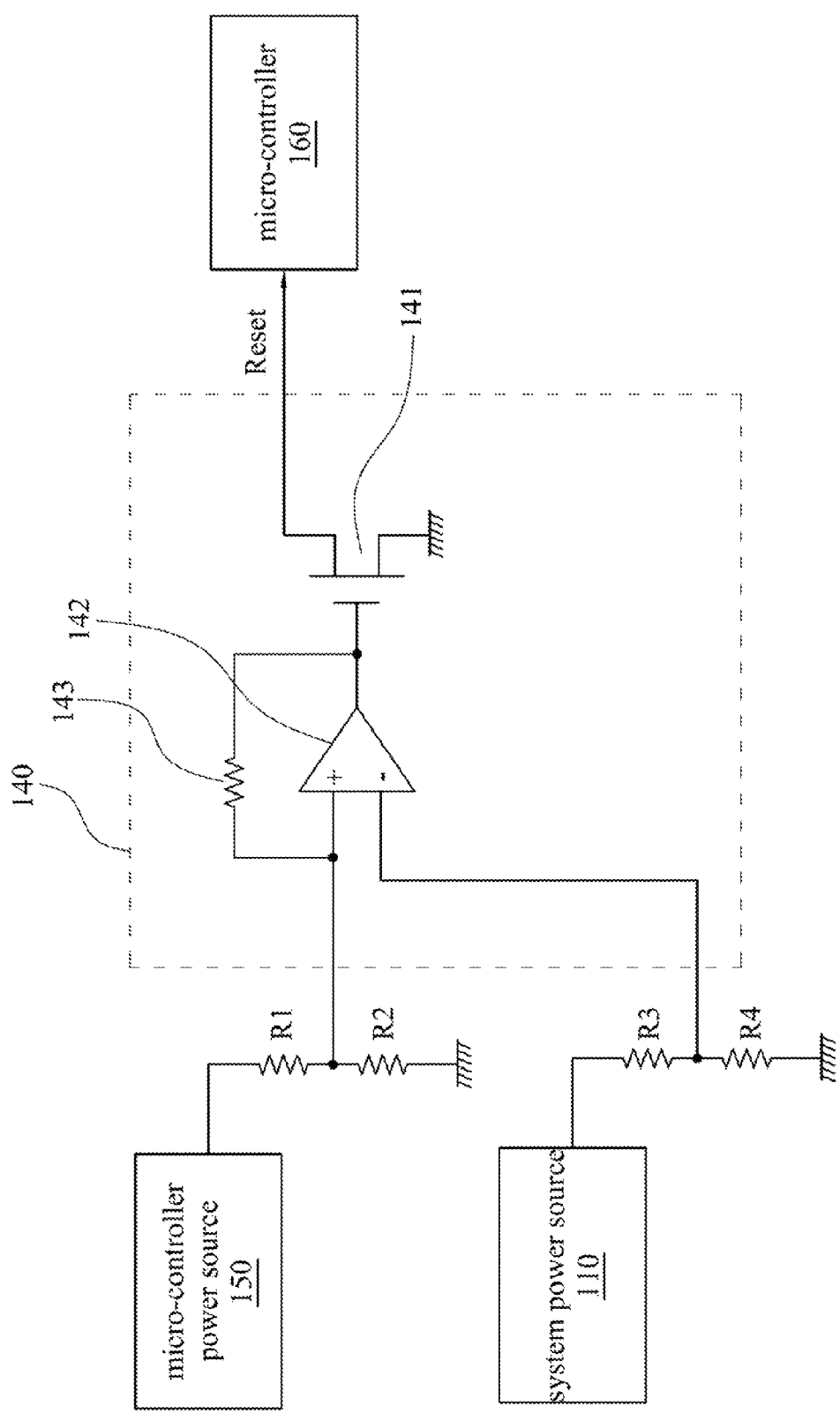
FIG. 2 illustrates a schematic diagram of a reset circuit according to an embodiment of the invention.

FIG. 2 illustrates a schematic diagram of a reset circuit according to an embodiment of the invention. The reset circuit 140 further comprises a first transistor 141 and a voltage comparator 142. The first transistor 141 includes three ends. The first end is electrically connected to the micro-controller 160, the second end is connected to ground, and the third end is a control end that is connected to an output end of the voltage comparator 142. The voltage comparator 142 includes a positive input end (+), a negative input end (−) and an output end. The positive input end (+) is electrically connected to a divided voltage of the micro-controller power source 150, the negative input end (−) is electrically connected to a divided voltage of system power source 110, and the output end is electrically connected to the control end of the first transistor 141. The resistors R1 and R2 divide the output voltage of the micro-controller power source 150, and the divided output voltage is transferred to the positive input end (+) of the voltage comparator 142. The resistors R3 and R4 divide the output voltage of the system power source 110, and the divided output voltage is transferred to the negative input end (−) of the voltage comparator 142. When the voltage at the positive input end (+) is smaller than that at the negative input end (−), the voltage comparator 142 outputs a negative voltage signal to the control end of the first transistor 141 so as to turn off the first transistor 141. In contrast, when the voltage at the positive input end (+) is greater than that at the negative input end (−), the voltage comparator 142 outputs a positive voltage signal to the control end of the first transistor 141 so as to turn on the first transistor 141. In an embodiment, when the voltage of the system power source 110 is dropped to be smaller than the second voltage, by designing the resistors R1, R2, R3 and R4 to make the voltage at the positive input end (+) greater than that in the negative input end (−), the voltage comparator 142 outputs a positive voltage signal to the control end of the first transistor 141 to turn on the first transistor 141. When the first transistor 141 is turned on, the first transistor 141 outputs a reset signal (Reset) to the micro-controller 160 to perform a reset process. Moreover, the reset circuit 140 further comprises a resistor 143. One end of the resistor 143 is electrically connected to the positive input end (+) of the voltage comparator 142, the other end of the resistor 143 is electrically connected to the output end of the voltage comparator 142. The resistor 143 accelerates the positive feedback of the voltage comparator 142.

Figure 3:
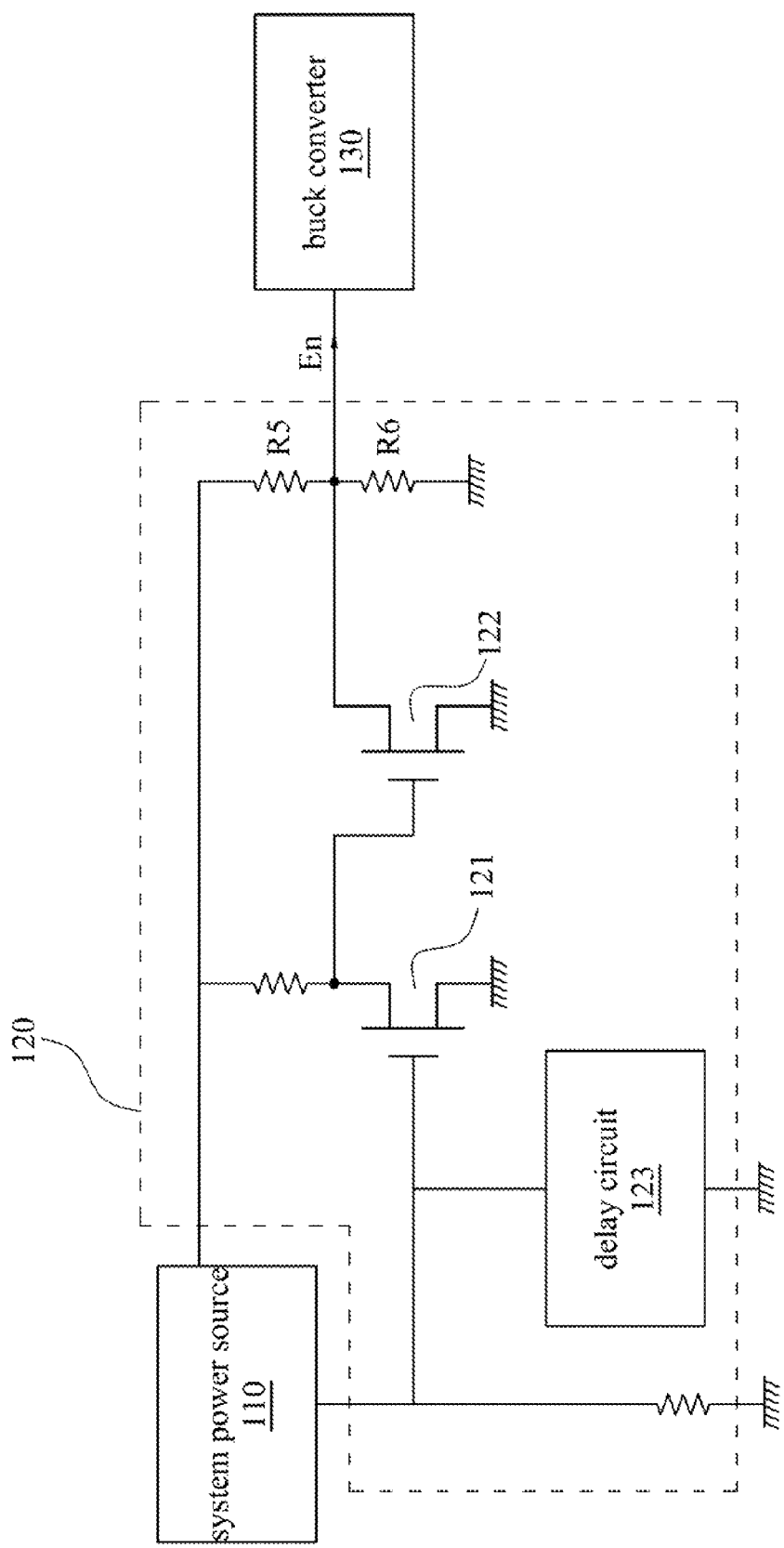
FIG. 3 illustrates a schematic diagram of an enable circuit according to an embodiment of the invention.

FIG. 3 illustrates a schematic diagram of an enable circuit according to an embodiment of the invention. The enable circuit 120 further comprises a second transistor 121 and a third transistor 122. The second transistor 121 includes three ends. The first end of the second transistor 121 is electrically connected to a control end of the third transistor 122, the second end thereof is connected to ground, and the third end thereof is a control end that is connected to the system power source 110. The third transistor 122 includes three ends. The first end of the third transistor 122 is electrically connected to the system power source 110 and the buck converter 130, the second end thereof is connected to ground, and the third end thereof is a control end that is connected to the second transistor 121.

In an embodiment, the enable signal (En) is 2 volts for enabling the buck converter 130. The resistors R5 and R6 divide the output voltage of the system power source 110 to get the enable signal (En). In this embodiment, the resistance of the resistor R5 is 11 Kohms. The resistance of the resistor R6 is 2 Kohms. Accordingly, when the output voltage (V1) of the system power source 110 is smaller than a third voltage, such as 2 volts, both of the second transistor 121 and the third transistor 122 are turned off. At this time, the voltage obtained by the resistors R5 and R6 dividing the output voltage from the system power source 110 for supplying power to the buck converter 130 has to be smaller than 2 volt. In this embodiment, this voltage is 0~0.36 volts. Therefore, the buck converter 130 is not enabled. When the output voltage (V1) of the system power source 110 is raised to be greater than the third voltage but smaller than the first voltage, such as the output voltage (V1) being greater than 2 volt but smaller than 9.83 volts, the third transistor 122 is turned on and the second transistor 121 is turned off. At this time, the enable signal is conducted to the ground through the third transistor 122. Therefore, the enable signal is 0 volt. That is, the buck converter 130 is at a disable state. When the output voltage (V1) of the system power source 110 is raised to be greater than the first voltage, 9.83 volts, the second transistor 121 is turned on. The control end of the third transistor 122 is conducted to the ground through the second transistor 121. Therefore, the third transistor 122 is turned off. At this time, the voltage obtained the resistors R5 and R6 dividing the output voltage (V1) from the system power source 110 for supplying power to the buck converter 130 acts as an enable signal (En). In this embodiment, this voltage is 1.8~2 volts. Because of the resistance preciseness of the resistor, this voltage is almost 2 volts. Accordingly, the enable signal (En) is from 0 volt to 2 volts to form a steep leading edge to improve the start speed of the buck converter 130. In another embodiment, the enable circuit 120 further comprises a delay circuit 123 electrically connected to the second transistor 121 and the system power source 110 to delay turning on the second transistor 121. Therefore, the time to turn off the third transistor 122 is also delayed to ensure obtaining the enable signal (En).

Figure 4:
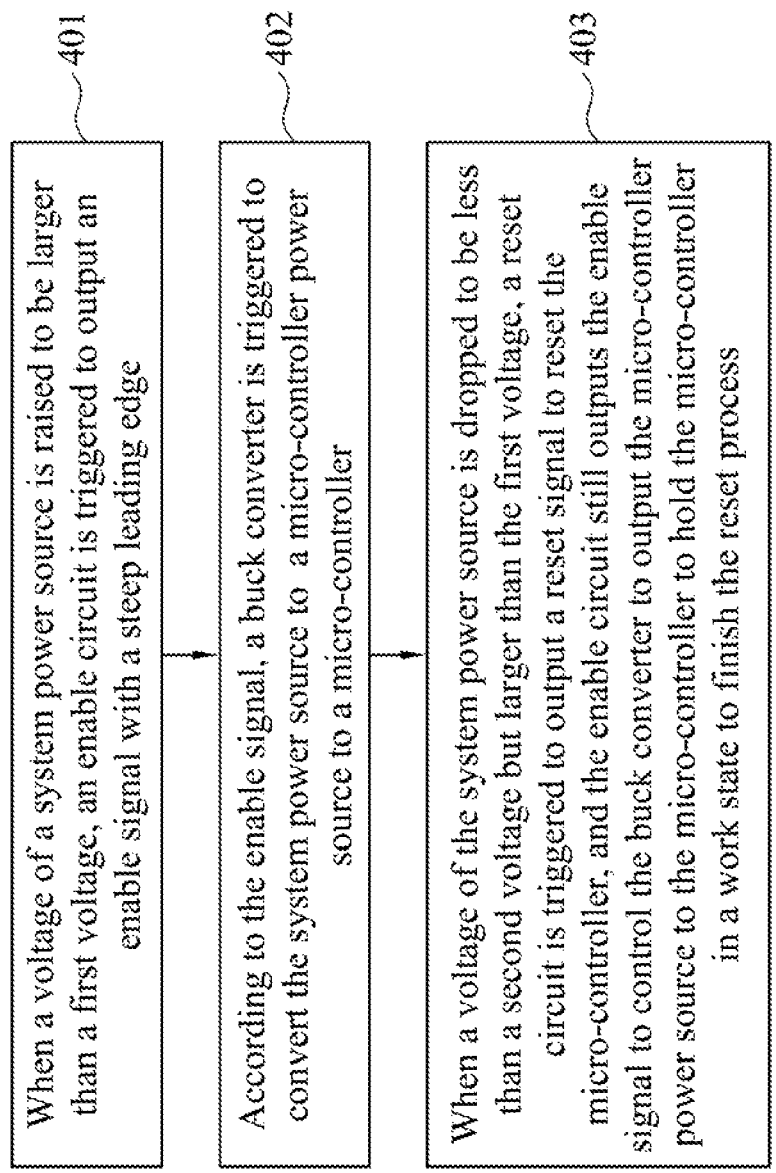
FIG. 4 illustrates a flow chart of a reset method according to an embodiment of the invention.

FIG. 4 illustrates a flow chart of a reset method according to an embodiment of the invention. According to the micro-controller reset method, in step 401, when a voltage of a system power source is raised to be greater than a first voltage, an enable circuit is triggered to output an enable signal with a steep leading edge. Then, in step 402, according to the enable signal, a buck converter is triggered. In an embodiment, the buck converter converts the system power source to output a micro-controller power source to a micro-controller. Next, in step 403, when a voltage of the system power source is dropped to be smaller than a second voltage but greater than the first voltage, a reset circuit is triggered to output a reset signal to reset the micro-controller, and the enable circuit keeps outputting the enable signal to control the buck converter to output the micro-controller power source to the micro-controller, thereby holding the micro-controller at a work state to finish the reset process.

Accordingly, when the electrical apparatus is turned off and the voltage of the system power source is dropped to be smaller than a specific voltage, the reset circuit outputs a reset signal to the micro-controller. At this time, the enable circuit continues to output the enable signal to hold the micro-controller at a work state to finish the reset process. Therefore, the micro-controller may perform a reset process according to the reset signal.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A micro-controller reset system, comprising:
an enable circuit electrically connected to a system power source, wherein when a voltage of the system power source is raised to be greater than a first voltage, the enable circuit outputs an enable signal with a steep leading edge;
a buck converter configured to convert the system power source to a micro-controller power source according to the enable signal, thereby supplying power to a micro-controller;
a reset circuit electrically connected to the system power source and the micro-controller power source, wherein when a voltage of the system power source is dropped to be smaller than a second voltage, the reset circuit outputs a reset signal to reset the micro-controller, wherein the first voltage is smaller than the second voltage,
wherein when the reset system enters a power drop state, a voltage of the system power source begins to drop to cause a voltage of the micro-controller power source to drop;
when a voltage of the system power source is dropped to be smaller than the second voltage but greater than the first voltage, the reset circuit outputs the reset signal and the enable circuit continues to output the enable signal; and
the enable signal controls the buck converter to output the micro-controller power source to the micro-controller to hold the micro-controller at a work state to receive the reset signal to perform a reset process; and
wherein the reset circuit further comprises:
a first transistor electrically connected to the micro-controller; and a voltage comparator electrically connected to the first transistor, wherein when a voltage of the system power source is dropped to be smaller than the second voltage, the voltage comparator outputs a positive voltage signal to turn on the first transistor, and when the first transistor is turned on, the first transistor outputs a reset signal to reset the micro-controller.

2. The micro-controller reset system of claim 1, wherein a positive input end of the voltage comparator electrically is connected to a divided voltage of the micro-controller power source, and a negative input end of the voltage comparator electrically is connected to a divided voltage of the system power source, and when a voltage at the positive input end is smaller than that at the negative input end, the voltage comparator outputs a negative voltage signal to turn off the first transistor.

3. The micro-controller reset system of claim 2, wherein the reset circuit further comprises a resistor, and one end of the resistor is electrically connected to the positive input end of the voltage comparator, and the other end of the resistor is electrically connected to an output end of the voltage comparator, wherein the resistor accelerates positive feedback of the voltage comparator.

4. The micro-controller reset system of claim 1, wherein the enable circuit further comprises:
   a second transistor electrically connected to the system power source; and
   a third transistor electrically connected to the second transistor, the system power source and the buck converter;
   wherein when a voltage of the system power source is raised to be greater than the first voltage, the second transistor is turned on and the third transistor is turned off to make the enable circuit output the enable signal.

5. The micro-controller reset system of claim 4, wherein when a voltage of the system power source is smaller than a third voltage, both of the second transistor and the third transistor are turned off, and a divided voltage of the system power source acts as the enable signal; and
   when a voltage of the system power source is raised to be greater than the third voltage but smaller than the first voltage, the third transistor is turned on to make the enable signal become 0 volt; and
   when a voltage of the system power source is raised to be greater than the first voltage, the second transistor is turned on and the third transistor is turned off to output the enable signal efficiently.

6. The micro-controller reset system of claim 5, wherein the enable circuit further comprises a delay circuit electrically connected to the second transistor and the system power source to delay turning on the second transistor.

7. A micro-controller reset method, comprising:
   triggering an enable circuit to output an enable signal with a steep leading edge when a voltage of a system power source is raised to be greater than a first voltage;
   triggering a buck converter to convert the system power source to a micro-controller power source according to the enable signal, thereby supplying power to a micro-controller;
   when a voltage of the system power source is dropped to be smaller than a second voltage but greater than the first voltage, triggering a reset circuit to output a reset signal to the micro-controller, and the enable circuit to keep outputting the enable signal to control the buck converter to output the micro-controller power source to the micro-controller, thereby make the micro-controller at a work state to finish a reset process; and
   wherein the reset circuit further comprises:
      a first transistor electrically connected to the micro-controller; and a voltage comparator electrically connected to the first transistor, wherein the voltage comparator is triggered to output a positive voltage signal to turn on the first transistor when a voltage of the system power source is dropped to be smaller than the second voltage, and when the first transistor is turned on, the first transistor outputs a reset signal to reset the micro-controller.

8. The micro-controller reset method of claim 7, wherein the enable circuit further comprising:
   a second transistor electrically connected to the system power source; and
   a third transistor electrically connected to the second transistor, the system power source and the buck converter;
   wherein when a voltage of the system power source is raised to be greater than the first voltage, the second transistor is turned on and the third transistor is turned off to make the enable circuit output the enable signal.

* * * * *